Nov. 26, 1946.  W. F. FELL  2,411,781
ELECTRICAL APPARATUS
Filed Oct. 9, 1943
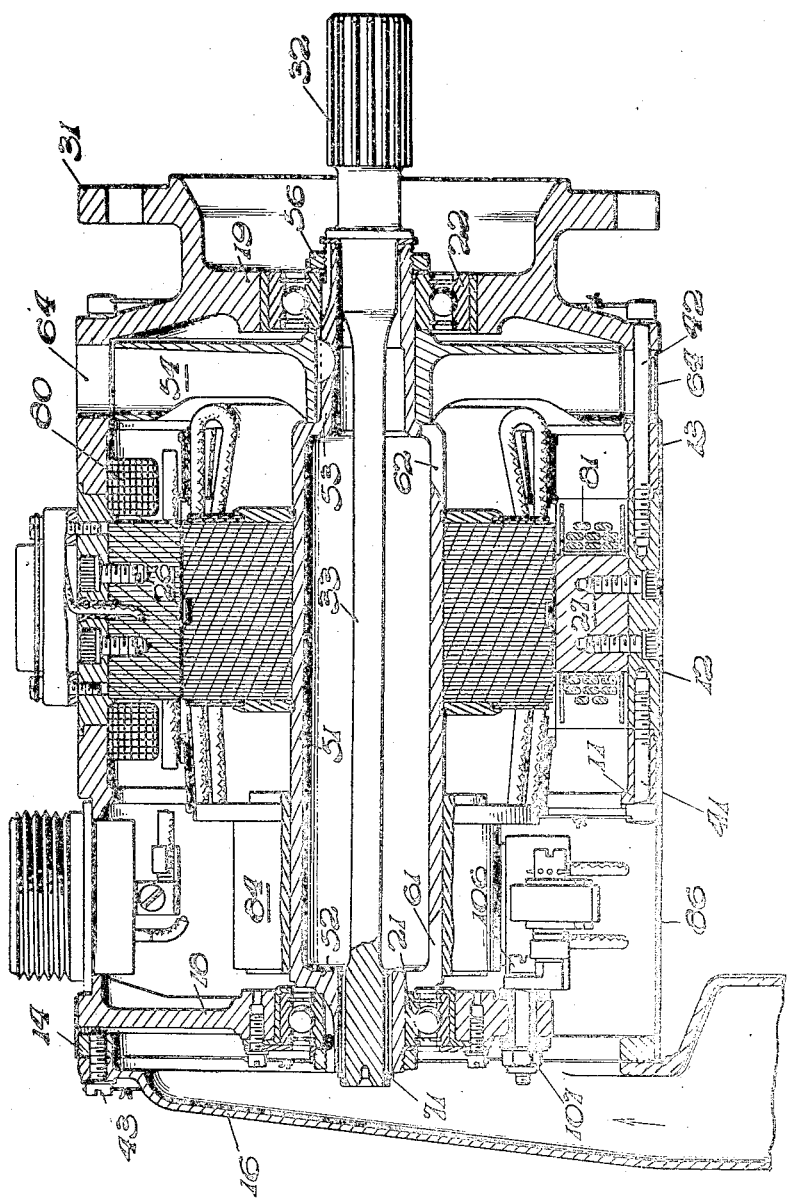
INVENTOR
William F. Fell.
BY Martin J. Finnegan
ATTORNEY Patented Nov. 26, 1946

2,411,781

UNITED STATES PATENT OFFICE 2,411,781

ELECTRICAL APPARATUS

William F. Fell, Hasbrouck Heights, N. J., assignor to Bendix Aviation Corporation, Teterboro, N. J., a corporation of Delaware Application October 9, 1943, Serial No. 505,688

3 Claims. (Cl. 171—252)

1

This invention relates to electrical apparatus, and particularly to engine-driven (variable speed) generators of the direct current generating class.

An object of the invention is to provide an improved generator adapted to operate over a wide speed range and yet maintain a large percentage of full rated current output, without voltage loss, even when the speed drops considerably below the normal running speed.

Other objects of the invention will become apparent from inspection of the following specification when read with reference to the accompanying drawing wherein is illustrated the preferred embodiment of the invention. It is to be expressly understood, however, that the drawing are for the purpose of illustration only, and are not designed as a definition of the limits of the invention, reference being had to the appended claims for this purpose.

In the drawing the single figure is a longitudinal sectional view of a device embodying the invention.

The invention is shown in the figure as incorporated in a cylindrical housing made up of a series of cylindrical sections 11, 12 and 13, an end ring 14, and an air spout 16 attachable to end ring 14. Sections 11 and 13 include bearing walls 18 and 19, respectively, to receive bearing assemblies 21 and 22, respectively, and section 12 receives the main field poles 26 as well as the interpoles 27 which are placed alternately with poles 26 about the circumference of the housing. Flange 31 facilitates mounting of the unit on the wall or crank-case of the prime mover and splined end 32 of pencil shaft 33 extends beyond the said flange 31 to receive the correspondingly splined driving shaft (not shown). Screws 41 and 42 fasten the sections 11 and 12 to the section 13 and thus, with screws 43, complete the assembly.

The hollow armature shaft 51 has a reduced end portion 52 which is internally splined to be driven by the external splines on the end of pencil shaft 33, and has another reduced end portion 53 to receive the fan 54 as well as the bearing assembly 22 and retainer nut 56. Ends 52 and 53 (one or both) are welded to the central part of shaft 51 after all said portions have been fully machined, including the forming of slots 61, 62 through which the cooling air currents pass into the hollow shaft interior in response to the rotation of fan 54; the air outlet openings in section 13 being shown at 64.

Shaft 33 is in effect a floating type of flexible torque shaft which is splined to the tubular armature shaft 51 at the commutator end of the unit, and held in place by means of a lock ring 71. As the drive spline 32 on the drive end of the flexible torque shaft engages the engine driving member, the flexibility of shaft 33 permits it to absorb engine torsional vibration and thus compensate for any slight drive misalignment. The bearings 21 and 22 are prelubricated, sealed ball bearings which prevent entrance of any dirt or foreign matter and assure sufficient lubrication under the conditions of blast cooling.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A device of the character described, comprising, in combination, an armature winding, a hollow shaft carrying said winding, a housing, sealed bearing assemblies at each end of said housing, said hollow shaft having reduced end portions supported in said bearing assemblies, slotted portions intermediate said end portions to admit cooling air currents to the shaft interior, and blower means carried on one of said reduced end portions to create a forced draft through said shaft interior.

2. A device of the character described, comprising, in combination, an armature winding, a hollow shaft carrying said winding, a housing, sealed bearing assemblies at each end of said housing, said hollow shaft having reduced end portions supported in said bearing assemblies, slotted portions intermediate said end portions to admit cooling air currents to the shaft interior, and blower means carried on one of said reduced end portions to create a forced draft through said shaft interior, at least one of said end portions being weld connected to the hollow central portion of said shaft.

3. A device of the character described, comprising, in combination, an armature winding, a hollow shaft carrying said winding, a housing, sealing bearing assemblies at each end of said housing, said hollow shaft having reduced end portions supported in said bearing assemblies, slotted portions intermediate said end portions to admit cooling air currents to the shaft interior, and blower means carried on one of said reduced end portions to create a forced draft through said shaft interior, and a torsion absorbing pencil shaft extending through said hollow shaft for driving connection therewith along one of the reduced end portions of said hollow shaft.

WILLIAM F. FELL.